United States Patent
Lucchesi

(10) Patent No.: US 6,890,038 B1
(45) Date of Patent: May 10, 2005

(54) BALANCING WEIGHT FOR VEHICLE TIRE

(76) Inventor: Ferdinando Lucchesi, 111, chemin de Saule, 1233 Bernex (CH)

( * ) Notice: Subject to any disclaimer, the term of this patent is extended or adjusted under 35 U.S.C. 154(b) by 100 days.

(21) Appl. No.: 10/415,005

(22) PCT Filed: Oct. 27, 2000

(86) PCT No.: PCT/IB00/01555
§ 371 (c)(1),
(2), (4) Date: Sep. 22, 2003

(87) PCT Pub. No.: WO02/35114
PCT Pub. Date: May 2, 2002

(51) Int. Cl.[7] .................................................. B60B 1/00
(52) U.S. Cl. .................. 301/5.21; 301/5.22; 152/154.1; 428/40.1
(58) Field of Search ................................ 301/5.21, 5.22; 152/154.1; 74/573 R, 573 F; 428/40.1, 40.9, 317.3, 41.7, 41.8, 344

(56) References Cited

U.S. PATENT DOCUMENTS 3,960,409 A * 6/1976 Songer ...................... 301/5.21
6,364,421 B1 * 4/2002 Pursley ...................... 301/5.21
6,619,119 B1 * 9/2003 Duggan et al. ................ 73/487

FOREIGN PATENT DOCUMENTS

| FR | 2792048 A1 * | 10/2000 | .......... B60C/13/00 |
| JP | 2001050350 A * | 2/2001 | ............ F16F/15/34 |
| WO | WO 99 55924 | 11/1999 | |
| WO | WO 99 55924 A1 * | 11/1999 | .......... C22C/13/00 |

* cited by examiner

Primary Examiner—Frantz F. Jules
(74) Attorney, Agent, or Firm—Young & Thompson

(57) ABSTRACT

A balancing weight for a vehicle tire consisting of a bar (1) comprising several balance weights (2, 3) which may be separated from one another. The bar (1) is made of a lead and tin alloy having 55 to 70% of lead and 30 to 45% of tin. Each balance weight (2, 3) is linked to its neighbors by a rod (4). It comprises a device for being fixed on a wheel.

6 Claims, 1 Drawing Sheet

BALANCING WEIGHT FOR VEHICLE TIRE

CROSS REFERENCE TO RELATED APPLICATIONS

This is the 35USC371 national stage of international application PCT/IB00/01555 filed on 27 Oct. 2000, which designated the United States of America.

BACKGROUND OF THE INVENTION

To balance the wheels of cars or motorcycles for example there are now used balancing weights of lead or lead and molybdenum alloy which are fixed to the rim of the wheel by a deformable clip or by a self-adhesive.

There are also known bars of balancing weight formed by several weights connected to each other and which can be separated with the help of a tool.

The drawback of these balancing weights resides in the fact of their appearance, thus they oxidize rapidly and become black and dirty. Moreover, the fact of having to use a tool to separate the weights from a bar is also a drawback.

SUMMARY OF THE INVENTION

The present invention has for its object to provide a balancing weight for vehicle wheels resisting oxidation, that can be separated from each other manually and is adapted to have a decorative appearance both as to their shape and as to their appearance which will be attractive.

The present invention has for its object a balancing weight formed by a bar comprising several weights that can be separated from each other.

BRIEF DESCRIPTION OF THE DRAWING

The accompanying drawing shows schematically and by way of example an embodiment of the balancing weight for a vehicle wheel according to the present invention.

DETAILED DESCRIPTION OF THE INVENTION

The balancing weight according to the invention is in the form of a bar 1 comprising several weights 2, 3 connected to each other but which can be detached from each other manually.

The balancing weight according to the invention is distinguished by the fact that it has weights 2, 3 of different shapes and weight, these weights having moreover elegant shapes, here in the form of an arrow for example.

Figure 1:
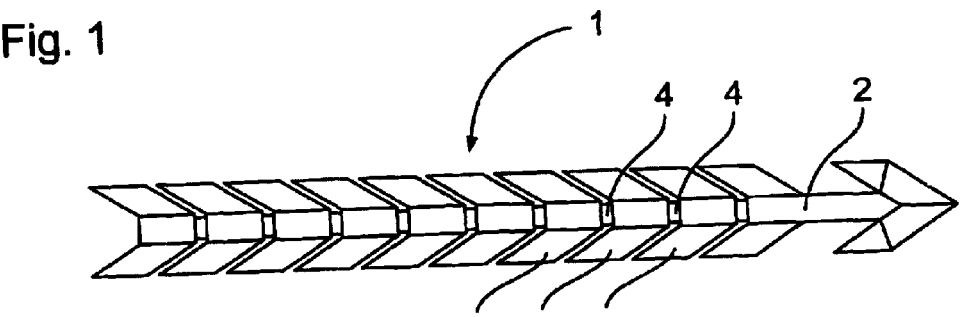
FIG. 1 is a top plan view.
Figure 2:
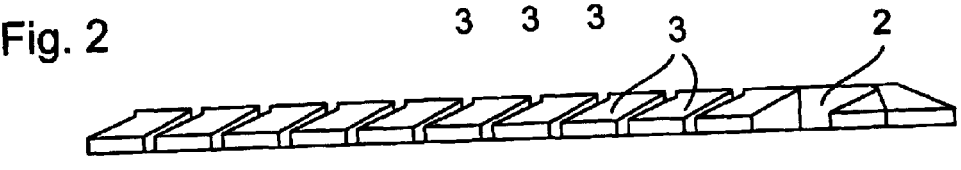
FIGS. 2 and 2*a* are respectively side and end views without its securement device.
Figure 2A:
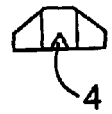
Figure 3:
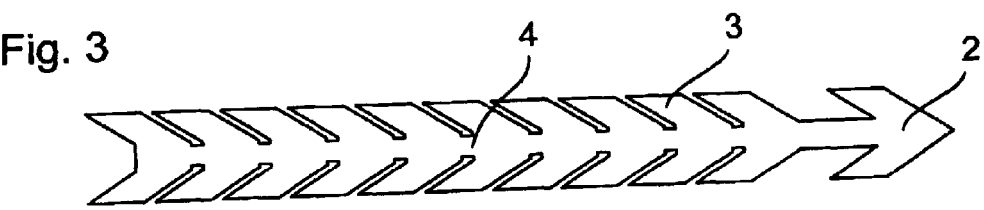
FIG. 3 is a top plan view also without its securement device.
Figure 4:
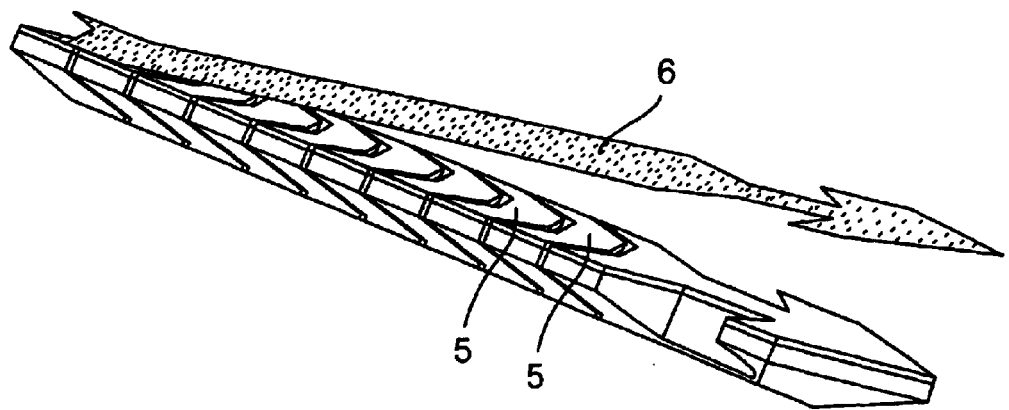
FIG. 4 is a perspective view, the weight being provided with its securement device.

The first weight 2 of the bar 1 can for example weigh ten grams and the other weights 3 can weigh only five grams. The bar 1 is produced in a single piece and the weights 2, 3 are interconnected by a blade of material or tongue 4 having in cross-section a triangular shape, as shown in FIG. 2*a*.

This balancing weight is made from a lead-tin alloy comprising 50 to 70% lead and 30 to 45% tin. Whilst having a specific weight about that of lead, this alloy has the advantage of not oxidizing and of being able to receive a surface treatment such as paint or heat lacquer, which permits ensuring an attractive and decorative appearance that will not change.

Moreover, this Pb—Sn alloy has a ductility such that if the weights of the bar are connected by tongues 4 having a cross-section which is preferably triangular, they can be easily separated manually simply by bending the bar at the triangular tongue.

If to balance a wheel it is necessary to have a mass of 25 grams, the user can break the bar 1 between the third and fourth weight 3. There is thus obtained a balancing weight comprising the weight 2 of ten grams and three weights 3 each of five grams. This mass has an attractive shape and can be colored by a coating.

Of course the shape of the weights 2, 3 can be modified, but they will always have a relatively complex shape, decorative and not simply a boring square or rectangular shape. These weights can for example have the form of a coat or arms or the marque of a vehicle.

The balancing weight according to the invention is provided with a securement device constituted by separate double surfaced self-adhesive elements 5 matching the shape of the rear surface of each weight 2, 3 and glued on these rear surfaces of the weights, and by a protective strip 6 protecting the self-adhesive surface of these elements 5 adapted to enter into contact with the wheel of the vehicle to which they are to be secured. This protective strip is peelable and can be manually removed. Preferably, this protective strip tears manually such that the portion of the latter which is superfluous after having detached a certain number of weights, can be manually removed.

What is claimed is:

1. Balancing weight for a vehicle wheel formed by a bar comprising several weights that can be separated from each other;

said bar being made of an alloy of lead and tin having 55 to 70% lead and 30 to 45% tin;

each weight being connected to a neighboring weight by a tongue having a triangular cross section; and each weight comprising a securement device for securement on the wheel.

2. The balancing weight according to claim 1, wherein the securement device comprises independent double-spaced self-adhesive elements glued on a rear surface of each weight, and a peelable protective strip protecting the surfaces of the self-adhesive elements adapted to be in contact with the wheel.

3. The balancing weight according to claim 2, wherein each weight has a decorative shape.

4. The balancing weight according to claim 1, wherein each weight has a decorative shape.

5. The balancing weight according to claim 4, wherein the bar comprises weights of different shapes.

6. The balancing weight according to claim 1, wherein the visible surfaces of the weights are provided with a colored coating.

* * * * *